United States Patent
Deiss et al.

(10) Patent No.: US 12,417,016 B2
(45) Date of Patent: Sep. 16, 2025

(54) GARBAGE-COLLECTION IN LOG-BASED BLOCK DEVICES WITH SNAPSHOTS

(71) Applicant: Google LLC, Mountain View, CA (US)

(72) Inventors: Olivier Deiss, Mountain View, CA (US); Grigory Borisovich Lyakhovitskiy, Redmond, WA (US); Dan Kimmel, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/064,373

(22) Filed: Dec. 12, 2022

(65) Prior Publication Data
US 2024/0192849 A1    Jun. 13, 2024

(51) Int. Cl.
*G06F 3/06* (2006.01)

(52) U.S. Cl.
CPC ............ *G06F 3/0608* (2013.01); *G06F 3/064* (2013.01); *G06F 3/0673* (2013.01)

(58) Field of Classification Search
CPC ........ G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41; G06F 17/00–40; G06F 21/00–88; G06F 2009/3883;
(Continued)

(56) References Cited

U.S. PATENT DOCUMENTS

| | | | | |
|---|---|---|---|---|
| 6,223,269 B1 * | 4/2001 | Blumenau | ........... | G06F 11/1435 719/321 |
| 6,772,296 B1 * | 8/2004 | Mathiske | ................ | G06F 12/08 365/185.11 |

(Continued)

FOREIGN PATENT DOCUMENTS

CN    115421648 A    12/2022

OTHER PUBLICATIONS

H. Gwak, Y. Kang and D. Shin, "Reducing garbage collection overhead of log-structured file systems with GC journaling," 2015 International Symposium on Consumer Electronics (ISCE), Madrid, Spain, 2015, pp. 1-2, doi: 10.1109/ISCE.2015.7177770. (Year: 2015).*

(Continued)

*Primary Examiner* — Daniel C. Chappell
(74) *Attorney, Agent, or Firm* — Shumaker & Sieffert, P.A.

(57) ABSTRACT

A method for garbage-collection includes obtaining a request to compact a plurality of log files of a log-structured volume. Each log file includes fresh block runs in use and stale block runs no longer in use. The log-structured volume includes a plurality of snapshots. For each respective snapshot, the method includes determining, using a plurality of interval maps, the fresh block runs of the plurality of log files used by the respective snapshot. For each respective log file, the method includes writing the fresh block runs of the respective log file to a respective compacted log file and generating a respective per-log diff file. The method includes, for each respective snapshot, generating a respective checkpoint based on respective per-log diff files and deleting each respective log file of the plurality of log files.

22 Claims, 8 Drawing Sheets

(58) Field of Classification Search
CPC .................. G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 2225/00–1094; H03M 7/00–707; H04L 9/00–38; H04L 12/00–66; H04L 41/00–5096; H04L 49/00–9094; H04L 61/00–59; H04L 67/00–75

See application file for complete search history.

(56) References Cited

U.S. PATENT DOCUMENTS

| | | | |
|---|---|---|---|
| 7,280,057 B2 * | 10/2007 | Delfs | H03M 7/30 341/87 |
| 7,925,856 B1 | 4/2011 | Greene | |
| 8,880,475 B2 * | 11/2014 | Olson | G06F 11/1464 707/649 |
| 9,767,106 B1 * | 9/2017 | Duggal | G06F 11/14 |
| 10,133,638 B1 * | 11/2018 | Sakdeo | G06F 16/11 |
| 10,402,091 B1 * | 9/2019 | Vankamamidi | G06F 3/0604 |
| 10,739,996 B1 * | 8/2020 | Ebsen | G06F 16/1727 |
| 10,885,022 B1 | 1/2021 | Tian | |
| 11,556,270 B2 * | 1/2023 | Lee | G06F 3/0652 |
| 11,609,698 B1 * | 3/2023 | Ito | G06F 12/0253 |
| 2006/0273934 A1 * | 12/2006 | Delfs | H03M 7/3086 341/50 |
| 2009/0164437 A1 * | 6/2009 | Torbjornsen | G06F 16/319 |
| 2011/0066668 A1 * | 3/2011 | Guarraci | G06F 16/188 707/831 |
| 2011/0307529 A1 * | 12/2011 | Mukherjee | G06F 16/1727 707/813 |
| 2014/0279900 A1 * | 9/2014 | Gupta | G06F 16/219 707/634 |
| 2014/0310499 A1 * | 10/2014 | Sundararaman | G06F 12/0269 711/203 |
| 2015/0120656 A1 * | 4/2015 | Ramnarayanan | G06F 16/1744 707/616 |
| 2017/0024451 A1 * | 1/2017 | Sullivan | G06F 16/273 |
| 2019/0065508 A1 * | 2/2019 | Guturi | G06F 16/2246 |
| 2021/0124343 A1 * | 4/2021 | Garcia | G05B 23/0221 |
| 2022/0066883 A1 | 3/2022 | Wang et al. | |
| 2022/0171537 A1 * | 6/2022 | Szczepanik | G06F 3/0665 |
| 2023/0004525 A1 * | 1/2023 | Desai | G06F 3/0661 |
| 2023/0325081 A1 * | 10/2023 | Patel | G06F 3/067 711/166 |
| 2023/0325116 A1 * | 10/2023 | Patel | G06F 3/0604 711/154 |

OTHER PUBLICATIONS

L. Chen, Z. Liu and W. Jia, "A snapshot system based on cloud storage Log-Structured Block System," Proceedings of the 11th IEEE International Conference on Networking, Sensing and Control, Miami, FL, USA, 2014, pp. 392-398, doi: 10.1109/ICNSC.2014.6819658. (Year: 2014).*

International Search Report and Written Opinion of International Application No. PCT/US2023/083495 dated Apr. 26, 2024, 10 pp.

Lee et al., "Validity Tracking Based Log Management for In-Memory Databases", IEEE Access, vol. 9, Sep. 9, 2021, pp. 111493-111504.

* cited by examiner

GARBAGE-COLLECTION IN LOG-BASED BLOCK DEVICES WITH SNAPSHOTS

TECHNICAL FIELD

This disclosure relates to garbage collection in log-based block devices with snapshots.

BACKGROUND

Log-based storage devices store data and metadata in one or more logs. That is, data is written to disk sequentially rather than scanning blocks across the disk. Because data is written sequentially, log-based storage devices may transform groups of small, synchronous writes into a few large, asynchronous sequential write operations. This can greatly increase write bandwidth by decreasing seek overhead. However, log-structured volumes and file systems must include careful management of free space. As the log begins to fill, garbage collection must be undertaken to free space in the log by deleting data no longer in use.

SUMMARY

One aspect of the disclosure provides a computer-implemented method for garbage collection of log-based block device that, when executed by data processing hardware, causes the data processing hardware to perform operations. The operations include obtaining a request to compact a plurality of log files of a log-structured volume. The log-structured volume includes a plurality of snapshots. Each snapshot of the plurality of snapshots is representative of a state of the log-structured volume at a different point in time. For each respective snapshot of the plurality of snapshots of the log-structured volume, the operations include determining fresh block runs of the plurality of log files used by the respective snapshot. For each respective log file of the plurality of log files, the operations include writing the fresh block runs of the respective log file to a respective compacted log file and generating a respective per-log diff file mapping a location of the written fresh block runs at the respective log file to a location of the written fresh block runs at the respective compacted log file. For each respective snapshot of the plurality of snapshots of the log-structured volume, the operations include generating a respective checkpoint based on respective per-log diff files and deleting each respective log file of the plurality of log files.

Implementations of the disclosure may include one or more of the following optional features. In some implementations, determining the fresh block runs includes using a plurality of interval maps where each respective interval map of the plurality of interval maps specifies the fresh block runs of a respective log file for each snapshot of the plurality of snapshots and the operations further include generating, using the plurality of log files and the plurality of snapshots, the plurality of interval maps. In some of these implementations, generating the plurality of interval maps includes scanning, for each snapshot of the plurality of snapshots, each log file of the plurality of log files.

Optionally, each fresh block run and each stale block run includes a tuple comprising a log file name, an offset, and a byte count. The operations further include, in some examples, selecting the plurality of log files from a set of log files based on a ratio of a sum of a size of the fresh block runs of each respective log file over a total size of each respective log file. In some of these examples, the operations further include, for each respective log file of the set of log files, determining the ratio for each respective log file using a respective interval map of the plurality of interval maps.

In some implementations, each log file of the plurality of log files is frozen. Obtaining the request to compact the plurality of log files may include determining a threshold amount of time has passed since a previous compaction. Each respective per-log diff file optionally includes an ordered list of tuples, each tuple representing a respective fresh block run and including an offset, a log file name, and a byte count. In some examples, the operations further include, for each deleted respective log file, deleting the respective per-log diff file. In some examples, each log file of the plurality of log files includes the fresh block runs representing contiguous blocks of data in use by the log-structured volume and stale block runs representing contiguous blocks of data no longer in use by the log-structured volume.

Another aspect of the disclosure provides a system for garbage collection of log-based block device. The system includes data processing hardware and memory hardware in communication with the data processing hardware. The memory hardware stores instructions that when executed on the data processing hardware cause the data processing hardware to perform operations. The operations include obtaining a request to compact a plurality of log files of a log-structured volume. The log-structured volume includes a plurality of snapshots. Each snapshot of the plurality of snapshots is representative of a state of the log-structured volume at a different point in time. For each respective snapshot of the plurality of snapshots of the log-structured volume, the operations include determining fresh block runs of the plurality of log files used by the respective snapshot. For each respective log file of the plurality of log files, the operations include writing the fresh block runs of the respective log file to a respective compacted log file and generating a respective per-log diff file mapping a location of the written fresh block runs at the respective log file to a location of the written fresh block runs at the respective compacted log file. For each respective snapshot of the plurality of snapshots of the log-structured volume, the operations include generating a respective checkpoint based on respective per-log diff files and deleting each respective log file of the plurality of log files.

This aspect may include one or more of the following optional features. In some implementations, the operations further include generating, using the plurality of log files and the plurality of snapshots, the plurality of interval maps. In some of these implementations, generating the plurality of interval maps includes scanning, for each snapshot of the plurality of snapshots, each log file of the plurality of log files.

Optionally, each fresh block run and each stale block run includes a tuple comprising a log file name, an offset, and a byte count. The operations further include, in some examples, selecting the plurality of log files from a set of log files based on a ratio of a sum of a size of the fresh block runs of each respective log file over a total size of each respective log file. In some of these examples, the operations further include, for each respective log file of the set of log files, determining the ratio for each respective log file using a respective interval map of the plurality of interval maps.

In some implementations, each log file of the plurality of log files is frozen. Obtaining the request to compact the plurality of log files may include determining a threshold amount of time has passed since a previous compaction. Each respective per-log diff file optionally includes an ordered list of tuples, each tuple representing a respective fresh block run and including an offset, a log file name, and a byte count. In some examples, the operations further include, for each deleted respective log file, deleting the respective per-log diff file. In some examples, each log file of the plurality of log files includes the fresh block runs representing contiguous blocks of data in use by the log-structured volume and stale block runs representing contiguous blocks of data no longer in use by the log-structured volume.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
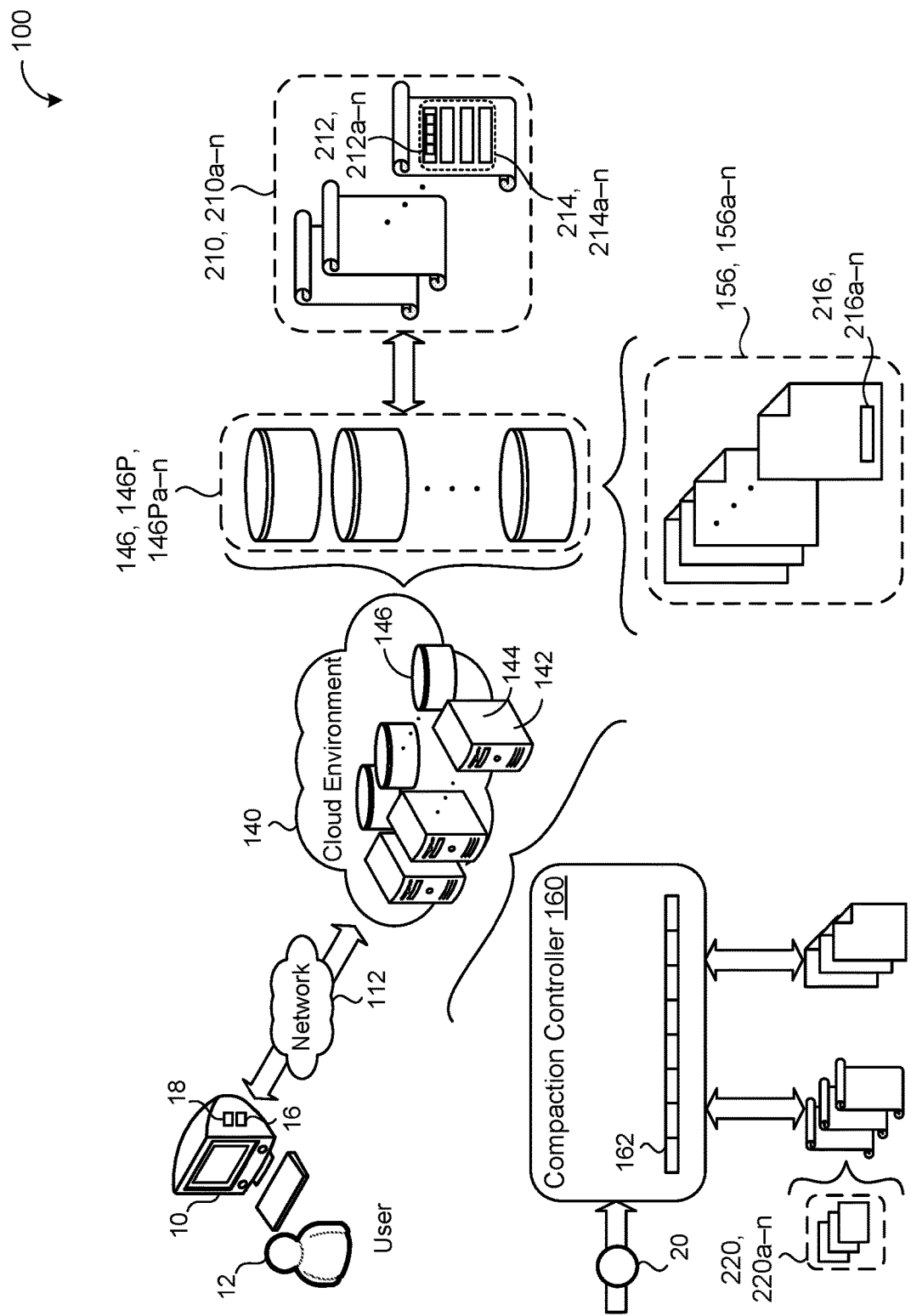
FIG. 1 is a schematic view of an example system for performing garbage collection on log-based block devices with snapshots.

Log-based storage devices and file systems store data and metadata in one or more logs. That is, data is written to disk sequentially rather than scatting blocks across the disk like most conventional file systems. Because data is written sequentially, log-based storage devices may transform groups of small, synchronous writes into a few large, asynchronous sequential write operations. This can greatly increase write bandwidth by decreasing seek overhead. However, log-structured volumes and file systems must include careful management of free space. As the log begins to fill, garbage collection must be undertaken to free space in the log by deleting data no longer in use.

Garbage collection of log-based block devices may be performed by background workers. These workers first load a checkpoint representing a point-in-time view of the device, and proceed to read the entirety of the device (e.g., all of the log files representing the device). These log files are filled with both fresh data that is still in use and stale data that is no longer in use. Next, the worker writes all of the fresh data out to new log files. After this process, the new log files only contain in-use data and the original input log files can be deleted.

The block device may support "snapshots." A snapshot is a state of the block device at a particular point in time. Snapshots serve many important functions, such as data protection and availability. However, these snapshots increase the complexity of garbage collection. Without performing garbage collection on the log files associated with the snapshots, the amount of space consumed on the device will rapidly increase. However, performing garbage collection on the snapshots is challenging due to the extra storage and processing costs for the worker, especially when the worker is designed with limited memory as a background process.

A naive implementation for garbage collection for such a system would include opening and reading the log files for each snapshot, writing out a new log file, and generating a new checkpoint for the snapshot. Each checkpoint defines, for each snapshot, the location in the log file of respective block runs (i.e., contiguous ranges of data blocks). However, building checkpoints in this manner requires a significant amount of memory as the worker must track the location of many data blocks. Because it is likely many snapshots "share" the same data (i.e., there may be little changes to the data between snapshots), using such large amounts of memory to generate very similar checkpoints is an inefficient use of resources.

Implementations herein are directed toward a compaction controller of a computing system (e.g., a distributed system) that enables efficient garbage collection or compaction of log-structured volumes (e.g., persistent disks) that employ snapshots. The compaction controller performs a scan to determine, using an interval map, which blocks of the log files are currently fresh or in use. The compaction controller writes all fresh blocks to new log files, and each time a block is moved from a source log file to a new log file, a record is added to a per-log diff file that indicates where the new data is now stored. The compaction controller merges the compacted log files into the system by writing a new checkpoint for each snapshot using the per-log diff files. The compaction controller, instead of tracking all of the new locations of the new data blocks in each of the different checkpoints, generates the per-log diff files per log file. Thus, each log file that the compaction controller compacts has an associated per-log diff file and when building the checkpoints, the compaction controller can go to the same per-log diff file for each snapshot that uses the respective log file, thus leveraging the limited differences in data between snapshots to greatly decrease the amount of resources required to generate the checkpoints.

Referring to FIG. 1, in some implementations, an example data compaction system 100 includes a remote system 140 in communication with one or more user devices 10 via a network 112. The remote system 140 may be a single computer, multiple computers, or a distributed system (e.g., a cloud environment) having scalable/elastic resources 142 including computing resources 144 (e.g., data processing hardware) and/or storage resources 146 (e.g., memory hardware). A data store (i.e., a remote storage device) may be overlain on the storage resources 146 to allow scalable use of the storage resources 146 by one or more of the clients (e.g., the user device 10) or the computing resources 144.

The storage resources 146 include one or more persistent disks 146, 146P, 146Pa-n. Each persistent disk 146 represents a durable network storage device that instances (e.g., virtual machines (VMs)) may access like a physical disk. Each persistent disk 146P may be distributed across several physical disks (e.g., solid-state drives (SSDs), hard disks, etc.). Each persistent disk 146P is a block-based log-structured volume. That is, each persistent disk 146P stores data via one or more log files 210, 210a-n. The persistent disks 146P may be divided into one or more segments of any size (e.g., 32 gigabytes per segment).

As the remote system 140 receives block runs 214, 214a-n to write to the persistent disks 146P (e.g., from user 12, the remote system 140 itself, a VM, or any other remote entity), the remote system 140 writes the block runs 214 to respective log files 210. Each block run 214 represents or is used to describe a location of a contiguous range of data blocks 212, 212a-n (e.g., 4k blocks) of the log files 210 and/or persistent disk 146P. In some examples, each block run 212 is a tuple that includes a log file name (i.e., a reference to which log file 210 the data blocks 212 are at), an offset (i.e., a location with the respective log file 210), and a byte count (i.e., a length or size of the range of data blocks 212). In some examples, depending on the file system in use on the persistent disk 146P, the block runs 214 may represent some or all of a data file. Periodically, or whenever certain conditions are satisfied, the remote system 140 captures a snapshot 156, 156a-n of the persistent disk(s) 146P. Each snapshot 156 captures or represents a state of the persistent disk 146P at the time of the snapshot 156 (i.e., the state of the block runs 214 at the point in time the snapshot 156 is taken). As used herein, snapshots 156 may also be referred to as "generations." Using the snapshots, a user 12 or the remote system 140 may recall the state of the persistent disk 146P at the point in time the snapshot 156 was taken for various reasons (e.g., data recovery). The remote system 140 may capture any number of snapshots 156 at any intervals (e.g., after a threshold period of time has passed since the last snapshot 156 was captured, whenever a threshold amount of data has been written to the log files 210, etc.). The snapshots 156, which represent a state of the block runs 214 at some point in the past, are contrasted against the "live device," which refers to the state of the block runs 214 of the persistent disk 146P at the current point in time. That is, the user 12 may query the live device of the persistent disk 146P to determine a current state of the block runs 214 stored at the persistent disk 146P or query a snapshot 156 to determine a state of the block runs 214 stored at the persistent disk 146P for a particular point in time in the past.

To track the locations of the block runs 214 in the log files 210, each snapshot 156 (and the live device) may include one or more checkpoints 216, 216a-n (i.e., checkpoint regions) that include pointers to locations within the log files 210 relevant to the locations of the block runs 214. In some examples, each checkpoint 216 is a mapping of a logical block address to a location in a respective log file 210. Optionally, there is a separate log file 210 per segment (e.g., per 32 gigabyte segment). When the remote system 140 receives a read request to retrieve a particular block run 214 (e.g., from the live device or a particular snapshot 156), the remote system 140 may reference the appropriate checkpoint(s) 216 to determine the one or more log files 210 that include the requested block run 214 and the location (e.g., an offset) within with the log files 210 that include the block run 214 or points to the block run 214. Some or all of the checkpoints 216 may be cached to volatile memory of the remote system 140 to decrease access times of reads and/or writes. In some examples, the remote system 140 uses other options to reconstruct a device (e.g., tail scanning) when checkpoints 216 are unavailable.

As the log files 210 accumulate data from written block runs 214, a capacity of the associated persistent disk 146P decreases. Without garbage collection (i.e., compaction), each persistent disk 146P will become unavailable for new data once the log files 210 of the persistent disk 146P reach the end of the device's capacity (e.g., a capacity allotted to the persistent disk 146P by the remote system and/or a capacity available to the remote system 140). To this end, the remote system 140 executes a compaction controller 160 that manages garbage collection and/or compaction of the block runs 214 stored within the log files 210.

The compaction controller 160 obtains a compaction request 20 to compact one or more of the log files 210 of the remote system 140. The request may come from a user 12, via another process or module of the remote system 140, or even generated by the compaction controller 160. The request may be in response to any number of compaction triggers being satisfied (e.g., a threshold amount of time having passed since a previous compaction, an amount of data written, free capacity of the persistent disks 146P, deletion of data or a snapshot 156, etc.). The compaction request 20 may request that all log files 210 be evaluated for compaction or, alternatively, only a subset of the log files 210 be evaluated for compaction. For example, the compaction request 20 may restrict the compaction to log files 210 associated with a particular user 12, a particular process/module, particular persistent disks 146P located within a particular geographical region, etc.

For each respective snapshot 156 included by the compaction request 20, the compaction controller 160 determines, using one or more interval maps 162, fresh block runs 214, 214F of the log files 210 used by the snapshot 156. Each interval map 162 specifies the fresh block runs 214F of a respective log file 210 for each snapshot 156. More specifically, in some implementations, each interval map 162 is a mapping from an offset in a respective log file 210 to data (e.g., metadata) about fresh block runs 214F. The compaction controller 160 may maintain a separate interval map 162 for each log file 210. The compaction controller 160 may generate and/or update the interval maps 162. For example, the compaction controller 160 scans, during a compaction event, for each snapshot 156, each log file 210 to generate the interval maps 162.

The fresh block runs 214F refer to block runs 214 that are in use. That is, fresh block runs 214F refer to block runs 214 that have not been modified (i.e., overwritten). This is in contrast to stale block runs 214, 214S, which refer to block runs 214 that are no longer in use. For example, a user 12 writes a block run 214 "foo.txt" to a persistent disk 146P. The remote system 140 writes the block run 214 to an appropriate log file 210 for the persistent disk 146P. This block run 214, at this point in time, is a fresh block run 214F. At a later point in time, the user 12 modifies "foo.txt." The remote system writes the modified block run 214 to a log file 210. The new, modified block run 214 is a fresh block run 214F, however the original block run 214 is now a stale block run 214S. That is, "foo.txt" now exists twice within the log files 210, with the first one being stale (because the second one "overwrote" its data) and the second one being fresh.

After determining the fresh block runs 210F of the log files 210, the compaction controller 160, for each respective log file 210, writes the fresh block runs 214F of the respective log file 210 to one or more respective new or compacted log files 210. The fresh block runs 214F from one respective log file 210, in some implementations, are spread across multiple new or compacted log files 210. As explained in more detail below, the new log files 210 include only the fresh block runs 214F and purposefully exclude any stale block runs 214S. Thus, the new log files 210 include only fresh block runs 214F from the original log files 210. The compaction controller 160 also, for each respective log file 210, generates a respective per-log diff file 220, 220a-n. Each respective per-log diff file 220 maps a location of the written fresh block runs 214F at the original log file 210 to a location of the written fresh block runs 214F at the new compacted log file 210.

The compaction controller 160, for each respective snapshot 156 (and for the live device), generates a respective new checkpoint 216 for the snapshot 156 based on or using the per-log diff file 220. That is, instead of reading or scanning the entirety of the snapshot 156, which may take a substantial amount of memory and other computational resources, the compaction controller 160 leverages the per-log diff file 220 when updating or modifying the original checkpoints 216 or generating the new checkpoints 216 for the snapshots 156. In some implementations, the compaction controller 160 generates the checkpoints 216 sequentially for the snapshots 156 by starting with the oldest snapshot 156 and finishing with the live device. After the compaction controller 160 generates all of the checkpoints 216, the new checkpoints 216 are merged into the snapshots 156 and the live device (i.e., the live device (or controlling virtual machine, etc.) is aware of the new mappings), the compaction controller 160 may delete the original, non-compacted log files 210, thus freeing space for the persistent disk 146P. In some implementations, the compaction controller 160 automatically deletes any log files 210 that are not referenced by any checkpoint 216. For example, once the updated checkpoints 216 merge, the original log files 210 are no longer referenced, and the compaction controller 160 may safely delete the unreferenced log files 210. The checkpoints 216 may merge under any number of conditions. For example, a VM regularly generates new checkpoints 216 (e.g., due to data written to the live device) and merge the checkpoints 216 from the compaction controller 160 simultaneously. The checkpoints 216 may merge during "offline compactions" (e.g., when the controlling VM is offline). The checkpoints 216 may merge immediately upon generation or after a period of time of certain conditions are satisfied.

Figure 2A:
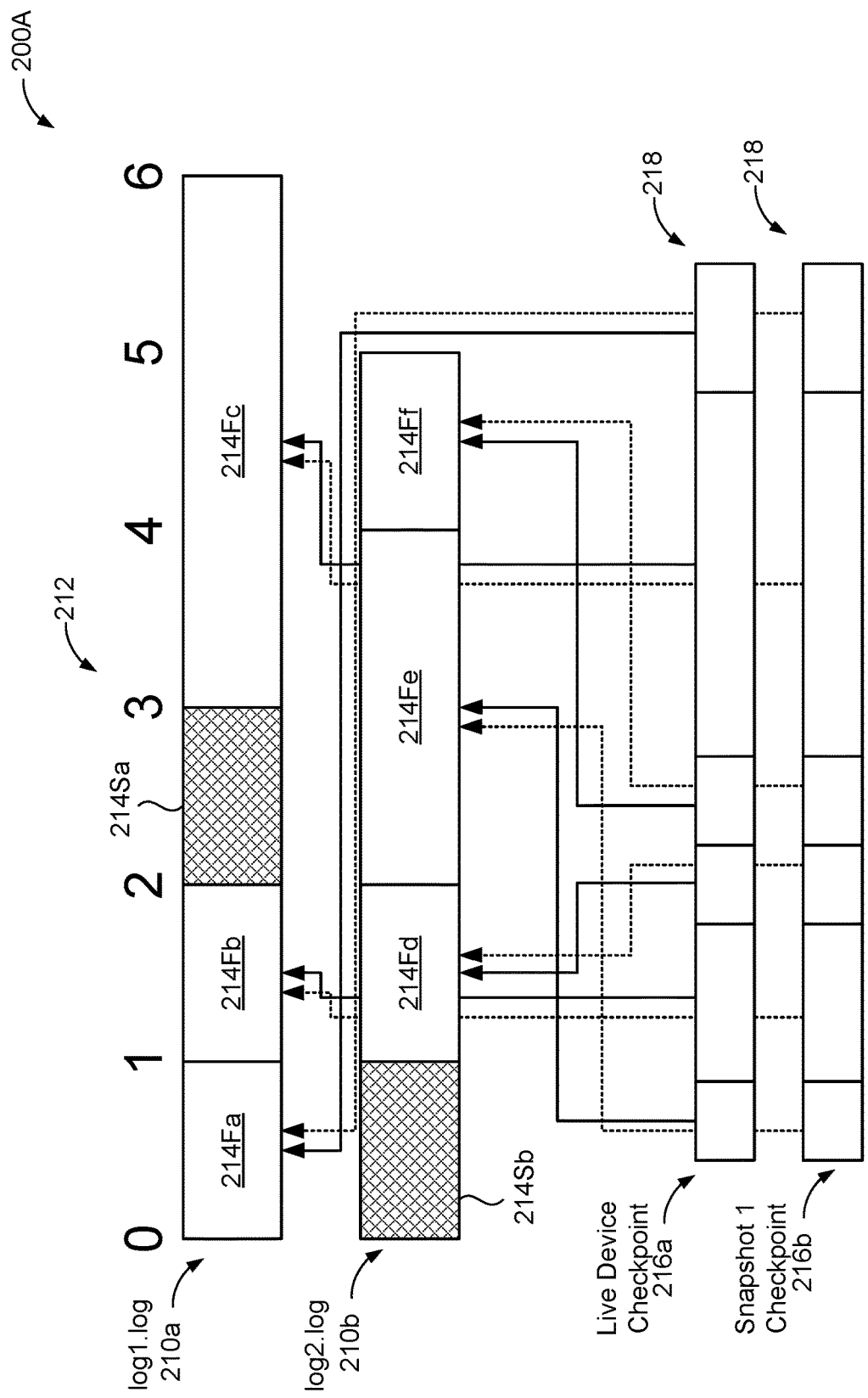
FIGS. 2A-2D are schematic views of exemplary log files during a compaction event.

Referring now to FIG. 2A, a schematic view 200a includes a simplified example of a persistent disk 146P represented by two log files 210a-b (i.e., a "log 1·log" first log file 210a and a "log 2·log" second log file 210b). The example also includes two checkpoints 216a-b that includes a "live device" first checkpoint 216a and a "snapshot 1" second checkpoint 216b. The first log file 210a includes four block runs 214 using six data blocks 212. The block runs 214 include three fresh block runs 214Fa-c and one stale block run 214Sa. The second log file 210b includes four block runs 214 that use five data blocks 212. These block runs 214 include three fresh block runs 214Fd-f and one stale block run 214Sb. Thus, the two log files 210a-b store a total of six fresh block runs 214Fa-f and two stale block runs 214Sa-b. The stale block runs 214S represent an opportunity for compaction or garbage collection.

Both checkpoints 216a-b include six regions 218, with each region 218 mapping to one of the six fresh block runs 214F. In this example, there were no changes to the block runs 214 of the log files 210a-b in the time between when the snapshot checkpoint 216b was created and the current live device checkpoint 216a (which represents the current state of the live device). Accordingly, each of the corresponding regions 218 between the two checkpoints 216a-b map to the same fresh block run 214F.

Figure 2B:
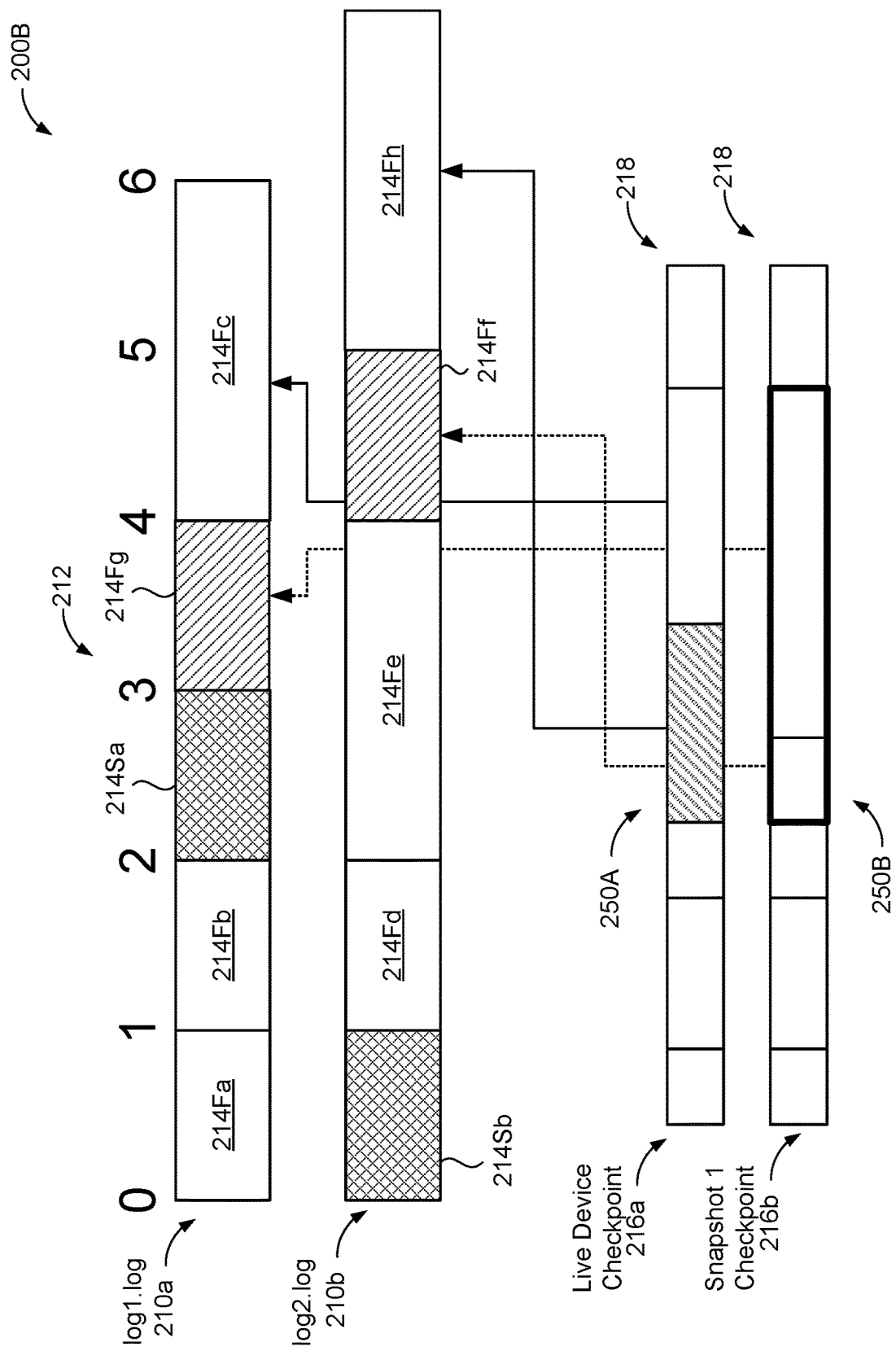

Referring now to FIG. 2B, a schematic view 200b continues the example of FIG. 2A. Here, two additional data blocks 212 have been written to the second log file 210b such that the first log file 210a still has six data blocks 212 of data while the second log file 210b now has seven data blocks 212 of data. Due to the addition of the new data, the live device checkpoint 216a updates accordingly to include the mapping to the new data of the log files 210. Due to the update, the mappings between the first checkpoint 216a (i.e., for the live device, which updated) and the second checkpoint 216b (i.e., for the snapshot 156, which did not update) are no longer the same. Specifically, when an area 250A of the live device checkpoint 216a mutated (i.e., updated), the snapshot checkpoint 216b gained an area 250B that maps to two locations in the log files 210a-b that the live device checkpoint 216a does not map to. While in a conventional log-structured volume without snapshots, these two locations (i.e., fresh block runs 214Ff, 214Fg) would be marked stale and be compacted, in this example, the snapshot 156 continues to use the fresh block runs 214Ff, 214Fg even after the live device updates, thus necessitating that the fresh block runs 214Ff, 214Fg stay fresh. As shown in schematic view 200C of FIG. 2C, after the live device checkpoint 216a mutates in response to the two new data blocks written to the second log file 210b, of the thirteen data blocks 212 of the log files 210a-b, two are stale and may be compacted, two are in use only by the snapshot 156, and the remaining nine are in use by the live device and/or the snapshot 156.

Figure 2C:
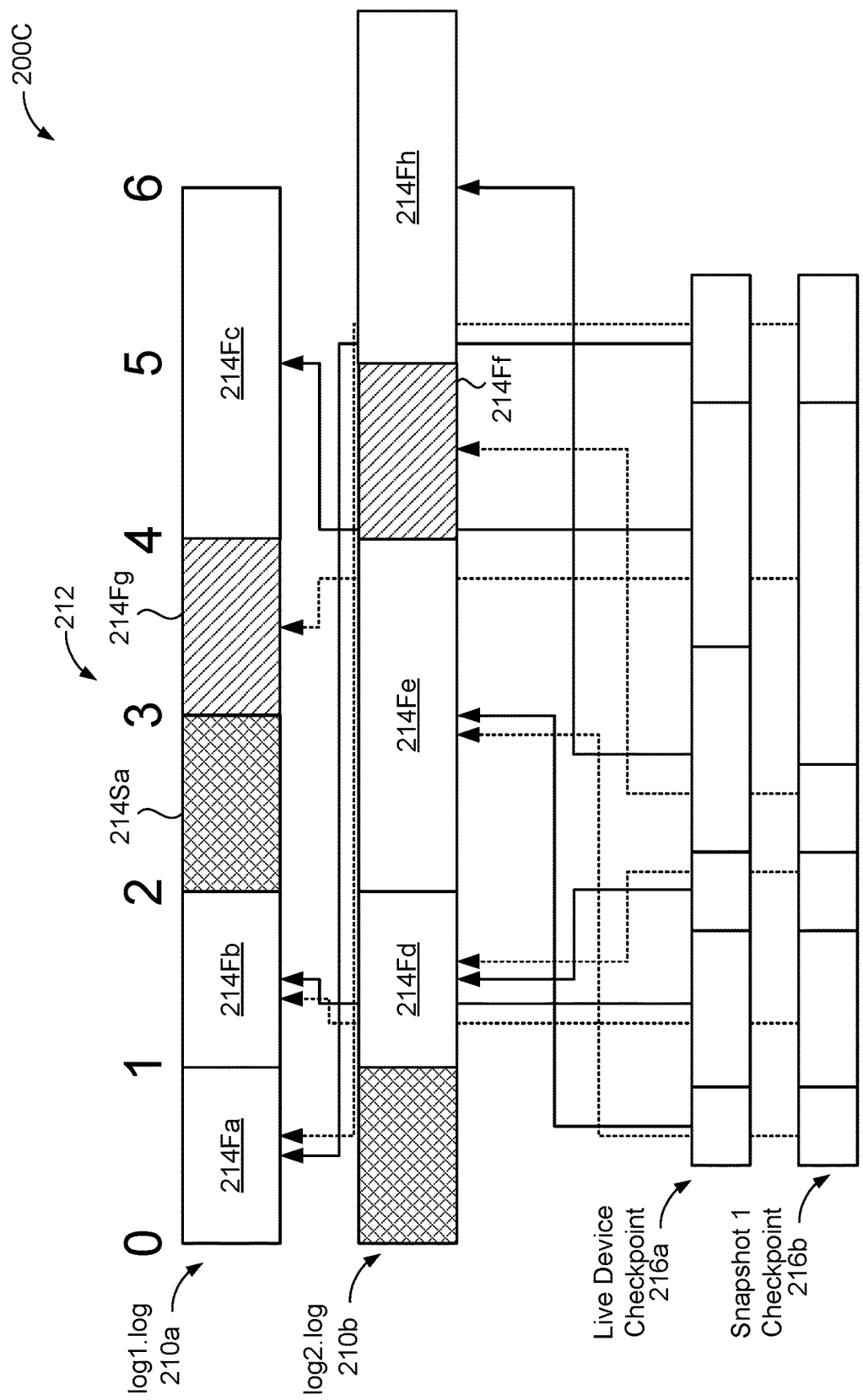
Figure 2D:
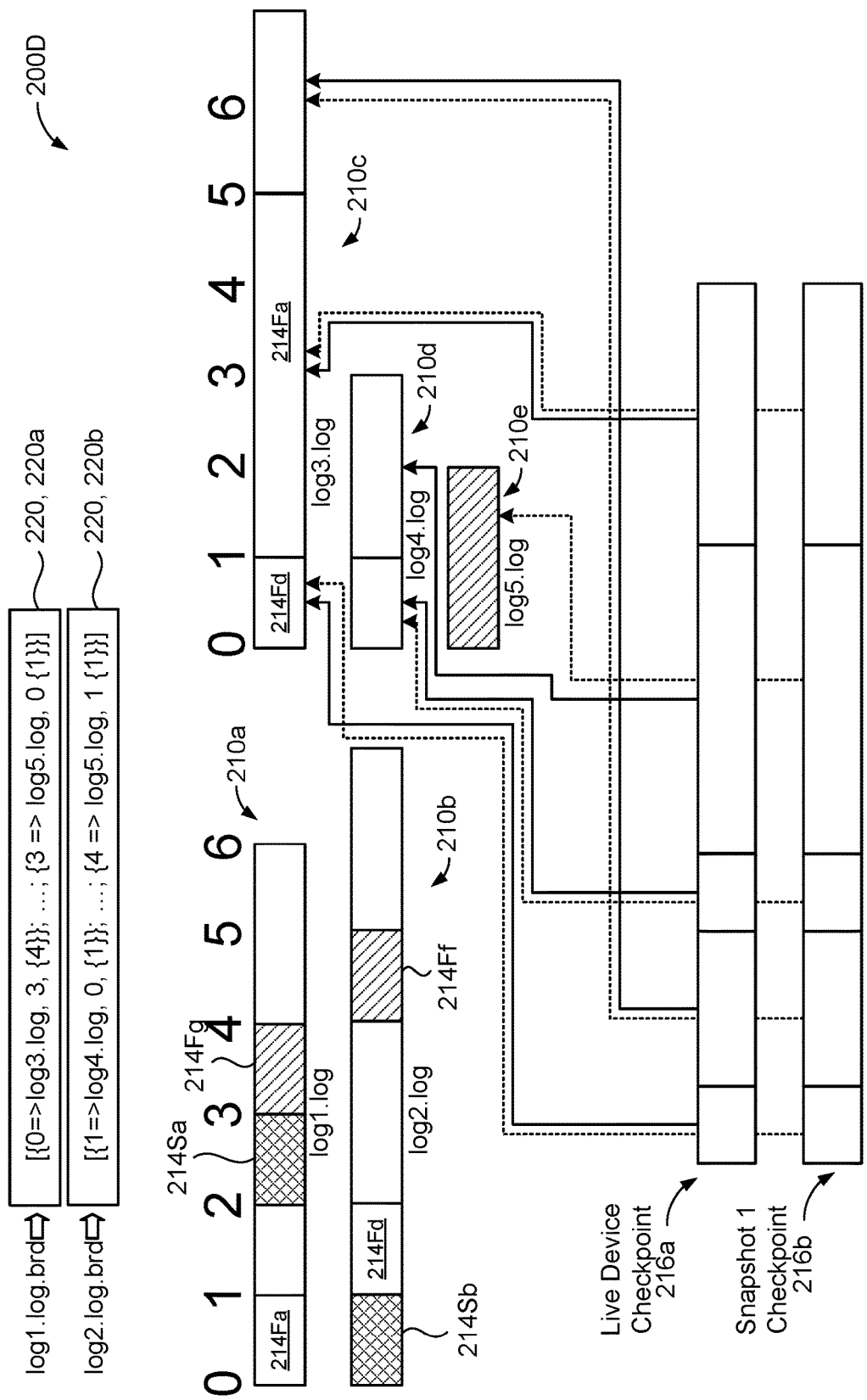

Referring now to FIG. 2D, a schematic view 200D continues the examples of FIGS. 2A-2C with an example of compacting the log files 210a-b. For clarity, each the individual files of the log files 210 are not labeled. Here, the original log files 210a-b include two stale block runs 214Sa-b. To compact these log files 210a-b, the compaction controller 160, in this example, generates two new log files 210c-d (i.e., "log 3·log" third log file 210c and "log 3·log" fourth log file 210d) that include all of the fresh block runs 214F of the original two log files 210a-b that the live device checkpoint 216a references. Notably, the compaction controller 160 does not write the stale block runs 210Sa-b to the new log files 210c-d. The compaction controller 160 must also maintain the two fresh block runs 214Ff-g that the live device checkpoint 216a does not reference but that the snapshot checkpoint 216b does reference. While the compaction controller 160 may write these fresh block runs 214Ff-g to the log files 210c-d, in this example, the compaction controller 160 generates a third new log file 210e (i.e., "log 5·log" fifth log file 210e) that includes only the fresh block runs 214Ff-g not referenced by the live device checkpoint 216a. By segregating these fresh block runs 214Ff-g into a separate log file 210e, future compactions may be simpler, as when the snapshot 156 associated with the snapshot checkpoint 216b is deleted, no other checkpoints 216 will reference the associated log file 210e, and the log file 210e may be deleted without any other compaction required.

While generating the new log files 210c-e, the compaction controller 160 also generates a corresponding per-log diff file 220a-b for each of the original log files 210a-b. Each per-log diff file 220 tracks movement of blocks still referenced by the live device checkpoint 216 or any snapshot checkpoint 216 from the compacted log file 210 to the new destination (e.g., a newly generated log file 210). In some implementations, each per-diff log file 220 includes an ordered list of tuples (e.g., a tuple include an offset element, a log file name element, and a byte count element). In some examples, each tuple includes {offset, block run} elements. Here, the offset element refers to the offset of the first data block 212 of the block run 214, and the block run 214 refers to a location of a contiguous range of data blocks 212. Each block run 214 may define the data blocks 212 used by the persistent disk 146P. The block run 214, in some examples, includes a tuple with <filename, offset, byte_count> elements.

In the example of FIG. 2D, two log files 210a-b are compacted, and accordingly, the compaction controller 160 generates two per-log diff files 220a-b. Here, the first per-log diff file 220a corresponds to the first log file 210a and the second per-log diff file 220b corresponds to the second log file 210b. The first per-log diff file 220a maps each of the block runs 214 (or block runs) of the first log file 210a to their destination locations in the new log files 210c-d. For example, the block run 214Fa located at data block '0' in the first log file 210a is now located at data block '3' of the first new log file 210c. Similarly, the second per-log diff file 220b maps the moved block runs 214 and/or block runs of the second log file 210b to the new logs files 210c-d. For example, the second per-log diff file 220b maps the fresh block run 214Fd located at data block '1' of the second log file 210b to data block '0' of the first new log file 210c.

Optionally, the compaction controller 160 periodically deletes the per-log diff files 220. For example, when the log file 210 the per-log diff file 220 is associated with is deleted (i.e., because the live device and snapshots 156 do not reference the log file 210), the per-diff log file 220 is also deleted.

The per-log diff files 220 summarize the shuffling of data that happens for each log file 210 during compaction. The per-log diff files 220 are relatively small (e.g., less than 10 mebibytes). Use of per-log diff files 220 instead of using one checkpoint 216 per compacted snapshot 156 is advantageous, as the per-log diff files 220 allow the compaction controller 160 to scale compaction to any number of snapshots 156 without requiring similarly scaling memory requirements. When using checkpoints 216 instead of per-log diff files 220, when one block 212 is referenced by all snapshots 156, the movement that occurs during the compaction of this block must be duplicated in all of the in-memory maps (i.e., one per snapshot 156), which greatly increases memory usage.

Figure 3:
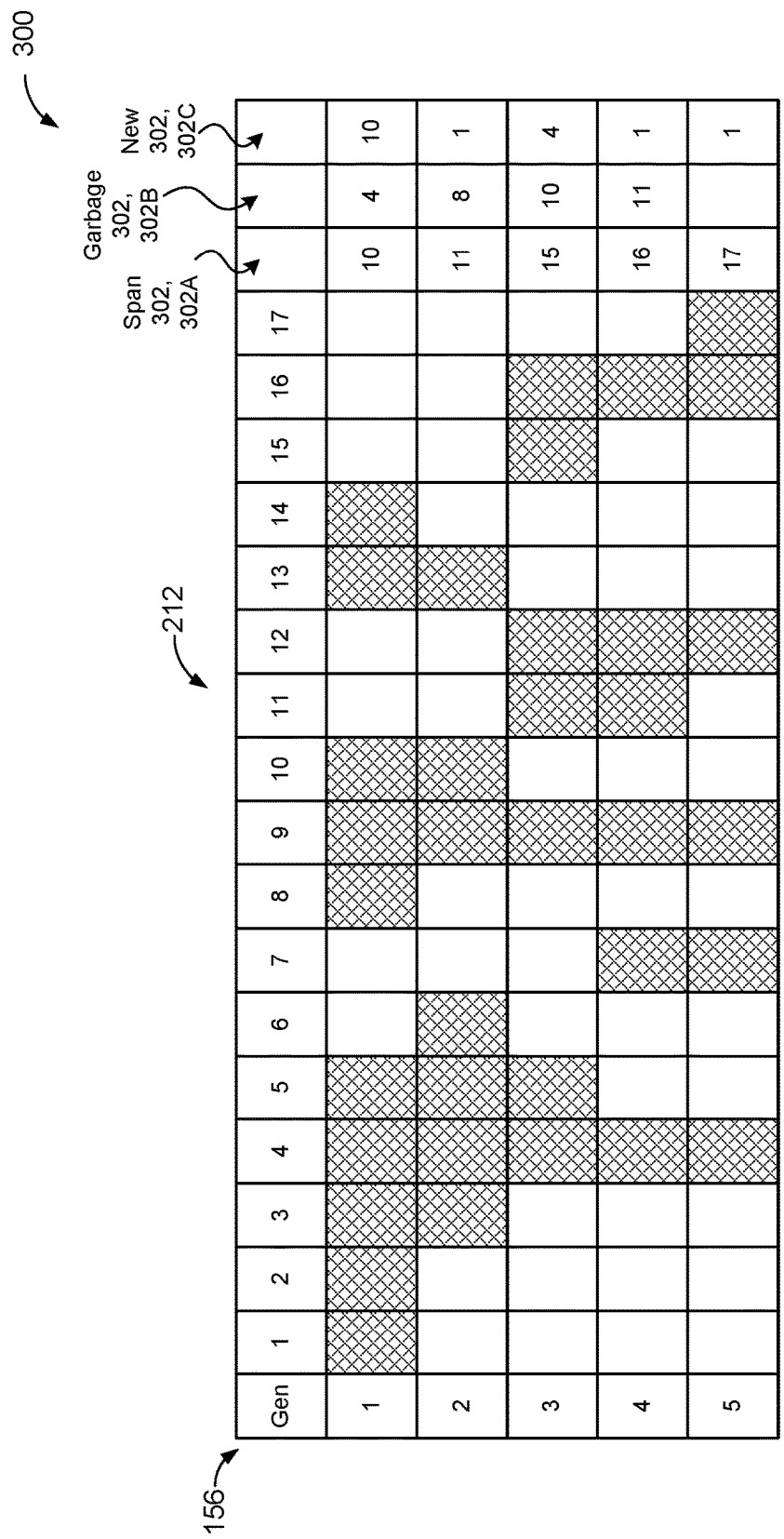
FIG. 3 is a schematic view of an exemplary snapshot statistics table.

Referring now to FIG. 3, in some implementations, the compaction controller 160 determines when to run a compaction (e.g., generate a compaction request 20) and/or a type of compaction to execute (e.g., a standard compaction that only compacts the live device versus a heavy compaction that compacts the live device and at least some snapshots 156). In some implementations, the compaction controller 160 executes a heavy compaction (i.e., compacts the snapshots 156) whenever a snapshot 156 is deleted. However, in some scenarios (e.g., when snapshot 156 churn is high), this technique may generate a large number of compactions. Additionally or alternatively, the compaction controller 160 determines a frequency and/or a type of compaction based on an "IS-density" of the live device and/or one or more snapshots 156. As used herein, the IS-density refers to a ratio of bytes used by the live device or snapshot 156 over a total size of the log file 210. Optionally, the compaction controller 160, during a compaction event, selects the log files 210 eligible for compaction based on the IS-density of the respective log file 210 (i.e., based on a ratio of a sum of a size of the fresh block runs of each respective log file over a total size of each respective log file). In this way, only a subset of available log files 210 may be compacted during any particular compaction event. As described in more detail below, the compaction controller 160, in some implementations, determines the IS-density using a respective interval map 162. In some implementations, only "frozen" log files 210 associated with snapshots 156 are eligible for compaction. Frozen log files 210 refer to log files 210 that are restricted from having new data written. That is, the remote system 140 will not write data to frozen log files 210.

To determine or track the IS-density, in some examples, the compaction controller 160 maintains a snapshot statistics table 300 for each log file 210. The compaction controller 160 may generate a new snapshot statistics table 300 periodically (e.g., whenever the compaction controller 160 executes a heavy compaction) and otherwise will maintain the snapshot statistics table 300 until a new snapshot statistics table 300 is generated.

In some implementations, the snapshot statistics table 300 stores a number of statistics 302. For example, the snapshot statistics table 300 stores a span statistic 302, 302A; a garbage statistic 302, 302B; and a new blocks statistic 302, 302C. The span statistic 302A defines, per respective snapshot 156 (i.e. per "generation"), a number of bytes in the log file 210 that are mapped or referenced by the respective snapshot 156 and each previous snapshot 156 (i.e., snapshots captured at an earlier point in time relative to the respective snapshot 156). The garbage statistic 302B defines, per respective snapshot 156, an amount of garbage bytes (i.e., bytes that are not referenced by any checkpoint 216) if the respective snapshot 156 and all previous snapshots 156 (i.e., snapshots captured at an earlier point in time relative to the respective snapshot 156) were deleted. The new block statistic 302C defines, per snapshot 156, a number of bytes in the log file 210 that are new relative to the previous snapshot 156.

Turning to the exemplary snapshot statistics table 300 of FIG. 3, here, the snapshot statistics table 300 includes statistics for five snapshots 156 (i.e., generations 1-5) and for seventeen bytes (or, alternatively, blocks). The first snapshot 156 (i.e., "Gen 1") includes ten new data bytes (indicated by the cross-hatch) written to the associated log file 210 (i.e., at byte locations 1-5, 8-10, 13, and 14) and seven byte locations are still empty. Accordingly, the span statistic 302A and the new block statistic 302C for the first snapshot 156 are ten. The garbage statistic 302B (which is four in this example), requires knowledge from the next snapshot 156 to determine. The second snapshot includes seven data bytes written to the associated log file (i.e., at byte locations 3-6, 9, 10, and 13). Four of the data bytes used by the first snapshot 156 are no longer used by the second snapshot, and therefore the garbage statistic 302B for the first snapshot 156 is four. The second snapshot 156 uses one additional data byte not used by the first snapshot 156, so the span statistic 302A for the second snapshot (i.e., "Gen 2") grows to eleven while the new block statistic 302C is set to one. A third snapshot 156 includes data bytes at byte locations 4, 5, 9, 11, 12, 15, and 16. The four new bytes added (i.e., at byte locations 11, 12, 15, and 16) set the span statistic 302A for the third snapshot 156 to fifteen and the new block statistic 302C to four. The snapshot statistics table 300 continues in this fashion for each snapshot 156 that references the associated log file 210. In some examples, the compaction controller 160 builds each snapshot statistics table 300 when performing a compaction (e.g., a heavy compaction) using the corresponding interval maps 162 and checkpoints 216.

At the beginning of a compaction, the compaction controller 160 may determine a number of checkpoints 216 and determine which checkpoints 216 have been deleted. However, storing all possibilities in the snapshot statistics table 300 generally requires significant resources as the number of snapshots 156 grows (i.e., in order to have data in case any subset of snapshots 156 are deleted). Instead, in some examples, the snapshot statistics table 300 is ideal for rolling schedules of snapshots 156 where the older snapshots 156 are deleted first. For example, if all snapshots 156 with generation a lower than N are removed, the compaction controller 160 determines a minimum number of garbage bytes based on the garbage statistic 302B from the N−1 snapshot 150. This is a minimum, as there may be potentially more garbage bytes from live device activity or from other deleted snapshots 156 with a generation larger than N. Accordingly, the compaction controller 160 may determine an upper bound of the IS-density of a respective log with $$ISD = \frac{L - \text{garbage}[N-1]}{L} \quad (1)$$

Here, ISD refers to the IS-density, L refers to a size (e.g., in bytes) of the respective log file 210, and garbage[N−1] refers to the garbage statistic 302B of the previous snapshot 156.

Using the new block statistic 302C from the snapshot statistics table 300, the compaction controller 160, in some examples, determines major changes in bytes mapped by different snapshots 156. In the example snapshot statistics table 300 of FIG. 3, it is clear that, while the third snapshot 156 (i.e., "Gen 3") reuses a lot of blocks used by previous snapshots 156, the snapshot 156 also introduces a lot of fresh data. When two adjacent snapshots 156 both introduce a lot of fresh data, deletion of the older snapshot 156 may indicate an appropriate time to execute a heavy compaction. The new block statistic 302C can correctly be summed for adjacent snapshots. For example, when generations [X, Y] are deleted and their summed new bytes (determined from the new block statistic 302C) is significant (e.g., above a threshold amount), while the new block statistic 302C for the snapshot 156 [Y+1] is also significant, then a compaction may also yield significant byte savings.

Figure 4:
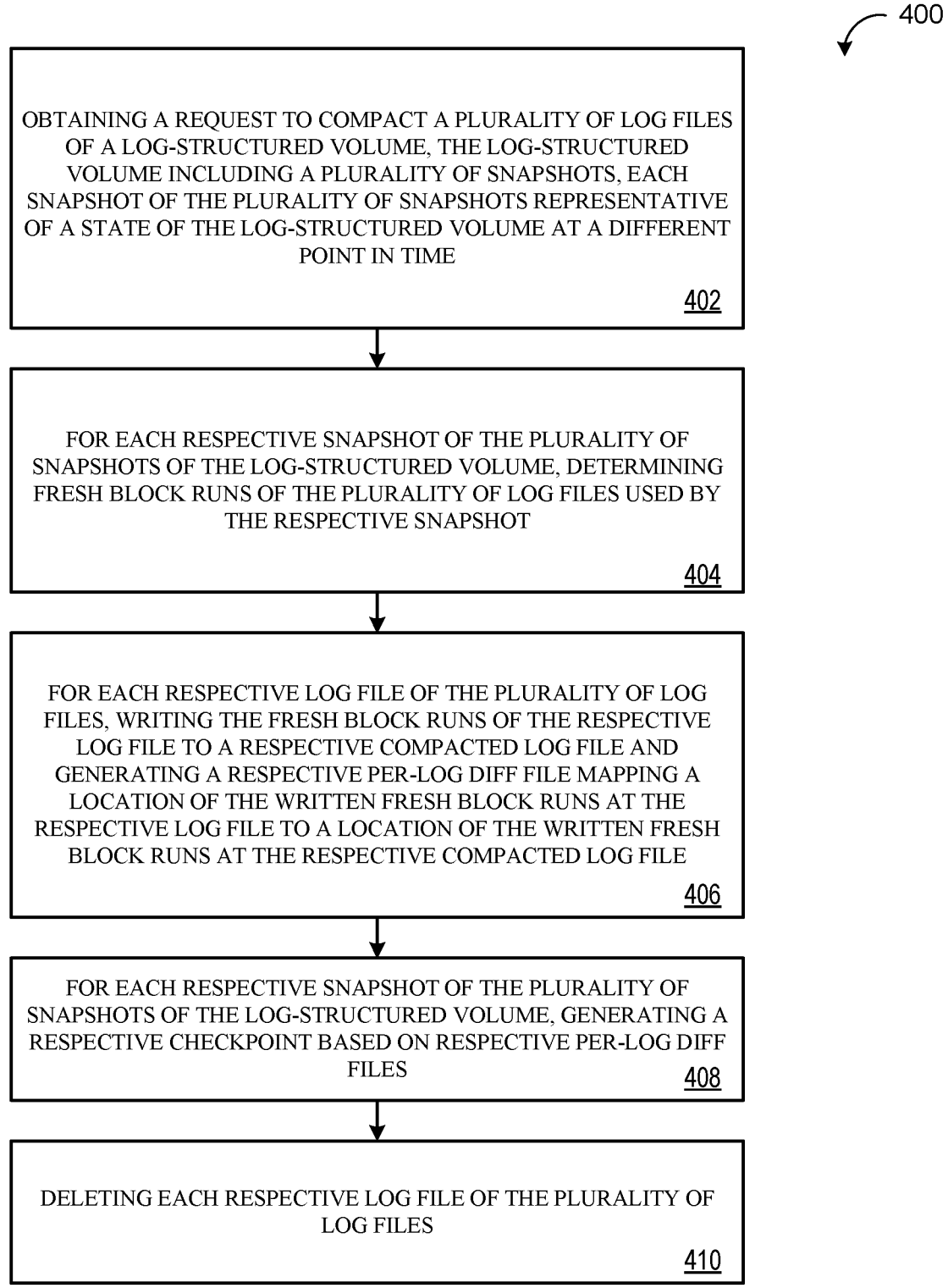
FIG. 4 a flowchart of an example arrangement of operations for a method of performing garbage collection on log-based block devices with snapshots.

FIG. 4 is a flowchart of an exemplary arrangement of operations for a method 400 of garbage collection in log-based block devices with snapshots. The computer-implemented method 400, when executed by data processing hardware 144, causes the data processing hardware 144 to perform operations. The method 400, at operation 402, includes obtaining a request 20 to compact a plurality of log files 210 of a log-structured volume 146P. Each log file 210 of the plurality of log files 210 may include fresh block runs 214F in use by the log-structured volume 146P and stale block runs 146S no longer in use by the log-structured volume 146P. The log-structured volume 146P includes a plurality of snapshots 156. Each snapshot 156 of the plurality of snapshots 156 is representative of a state of the log-structured volume 146P at a different point in time.

At operation 404, the method 400 includes, for each respective snapshot 156 of the plurality of snapshots 156 of the log-structured volume 146P, determining the fresh block runs 214F of the plurality of log files 210 used by the respective snapshot 156. Optionally, the method 400 includes using a plurality of interval maps 162 to determine the fresh block runs 214F. Each respective interval map 162 of the plurality of interval maps 162 specifies the fresh block runs 214F of a respective log file 210 for each snapshot 156 of the plurality of snapshots 156. For each respective log file 210 of the plurality of log files 210, the method 400, at operation 406, includes writing the fresh block runs 216F of the respective log file 210 to a respective compacted log file 210 and generating a respective per-log diff file 220 mapping a location of the written fresh block runs 214F at the respective log file 210 to a location of the written fresh block runs 214F at the respective compacted log file 210.

At operation 408, the method 400 includes, for each respective snapshot 156 of the plurality of snapshots 156 of the log-structured volume 146P, generating a respective checkpoint 216 based on respective per-log diff files 220. At operation 410, the method 400 includes deleting each respective log file 210 of the plurality of log files 210.

Figure 5:
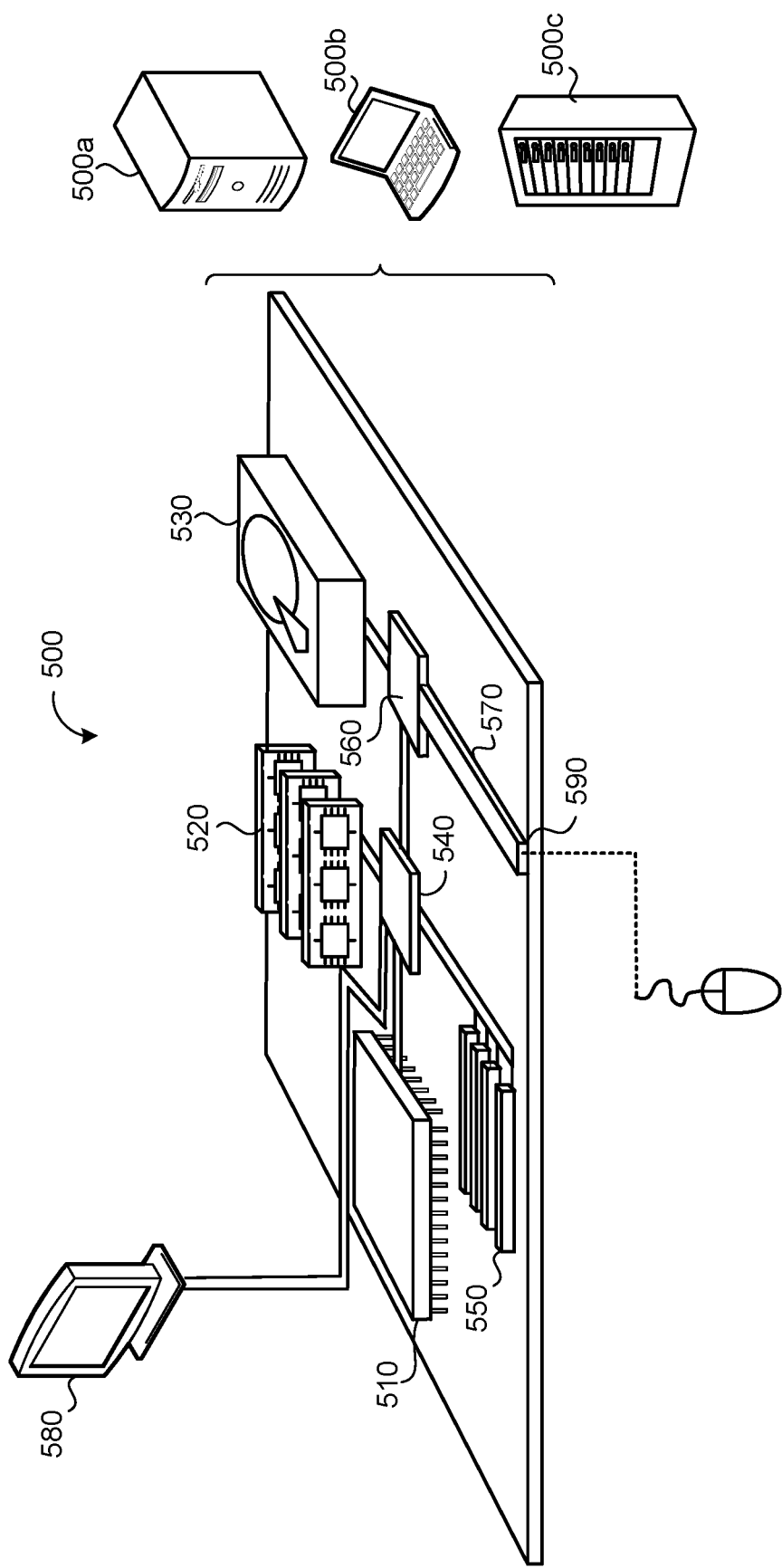
FIG. 5 is a schematic view of an example computing device that may be used to implement the systems and methods described herein.

FIG. 5 is a schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed by data processing hardware that causes the data processing hardware to perform operations comprising:

obtaining a request to compact a plurality of first log files of a log-structured volume, the log-structured volume comprising a plurality of snapshots, each snapshot of the plurality of snapshots representative of a state of the log-structured volume at a different point in time;

for each respective snapshot of the plurality of snapshots of the log-structured volume, determining fresh block runs of the plurality of first log files in use by the respective snapshot of the log-structured volume, the fresh block runs representing contiguous blocks of data that have not been overwritten;

for each respective first log file of the plurality of first log files:

writing the fresh block runs of the respective first log file to one or more respective second log files different from the plurality of first log files; and generating a respective per-log diff file mapping a location of the written fresh block runs at the respective first log file to a location of the written fresh block runs at the one or more respective second log files;

for each respective snapshot of the plurality of snapshots of the log-structured volume, generating a respective checkpoint based on respective per-log diff files; and deleting each respective first log file of the plurality of first log files.

2. The method of claim 1, wherein:

determining the fresh block runs comprises using a plurality of interval maps, each respective interval map of the plurality of interval maps specifying the fresh block runs of a respective first log file for each snapshot of the plurality of snapshots; and the operations further comprise generating, using the plurality of first log files and the plurality of snapshots, the plurality of interval maps.

3. The method of claim 2, wherein generating the plurality of interval maps comprises scanning, for each snapshot of the plurality of snapshots, each first log file of the plurality of first log files.

4. The method of claim 1, wherein each fresh block run and each stale block run comprises a tuple comprising a log file name, an offset, and a byte count.

5. The method of claim 1, wherein the operations further comprise selecting the plurality of first log files from a set of first log files based on a ratio of a sum of a size of the fresh block runs of each respective first log file over a total size of each respective first log file.

6. The method of claim 5, wherein the operations further comprise, for each respective first log file of the set of first log files, determining the ratio for each respective first log file using a respective interval map specifying the fresh block runs of a respective first log file for each snapshot of the plurality of snapshots.

7. The method of claim 1, wherein each first log file of the plurality of first log files is frozen.

8. The method of claim 1, wherein obtaining the request to compact the plurality of first log files comprises determining a threshold amount of time has passed since a previous compaction.

9. The method of claim 1, wherein each respective per-log diff file comprises an ordered list of tuples, each tuple representing a respective fresh block run and comprising an offset, a log file name, and a byte count.

10. The method of claim 1, wherein the operations further comprise, for each deleted respective first log file, deleting the respective per-log diff file.

11. The method of claim 1, wherein each first log file of the plurality of first log files comprises the fresh block runs representing respective contiguous blocks of data in use by the log-structured volume and stale block runs representing respective contiguous blocks of data no longer in use by the log-structured volume.

12. A system comprising:

data processing hardware; and memory hardware in communication with the data processing hardware, the memory hardware storing instructions that when executed on the data processing hardware cause the data processing hardware to perform operations comprising:

obtaining a request to compact a plurality of first log files of a log-structured volume, the log-structured volume comprising a plurality of snapshots, each snapshot of the plurality of snapshots representative of a state of the log-structured volume at a different point in time;

for each respective snapshot of the plurality of snapshots of the log-structured volume, determining fresh block runs of the plurality of first log files in use by the respective snapshot of the log-structured volume, the fresh block runs representing contiguous blocks of data that have not been overwritten;

for each respective first log file of the plurality of first log files:

writing the fresh block runs of the respective first log file to one or more respective second log files different from the plurality of first log files; and generating a respective per-log diff file mapping a location of the written fresh block runs at the respective first log file to a location of the written fresh block runs at the one or more respective second log files;

for each respective snapshot of the plurality of snapshots of the log-structured volume, generating a respective checkpoint based on respective per-log diff files; and deleting each respective first log file of the plurality of first log files.

13. The system of claim 12, wherein:

determining the fresh block runs comprises using a plurality of interval maps, each respective interval map of the plurality of interval maps specifying the fresh block runs of a respective first log file for each snapshot of the plurality of snapshots; and the operations further comprise generating, using the plurality of first log files and the plurality of snapshots, the plurality of interval maps.

14. The system of claim 13, wherein generating the plurality of interval maps comprises scanning, for each snapshot of the plurality of snapshots, each first log file of the plurality of first log files.

15. The system of claim 12, wherein each fresh block run and each stale block run comprises a tuple comprising a log file name, an offset, and a byte count.

16. The system of claim 12, wherein the operations further comprise selecting the plurality of first log files from a set of first log files based on a ratio of a sum of a size of the fresh block runs of each respective first log file over a total size of each respective first log file.

17. The system of claim 16, wherein the operations further comprise, for each respective first log file of the set of first log files, determining the ratio for each respective first log file using a respective interval map specifying the fresh block runs of a respective first log file for each snapshot of the plurality of snapshots.

18. The system of claim 12, wherein each first log file of the plurality of first log files is frozen.

19. The system of claim 12, wherein obtaining the request to compact the plurality of first log files comprises determining a threshold amount of time has passed since a previous compaction.

20. The system of claim 12, wherein each respective per-log diff file comprises an ordered list of tuples, each tuple representing a respective fresh block run and comprising an offset, a log file name, and a byte count.

21. The system of claim 12, wherein the operations further comprise, for each deleted respective first log file, deleting the respective per-log diff file.

22. The system of claim 12, wherein each first log file of the plurality of first log files comprises the fresh block runs representing respective contiguous blocks of data in use by the log-structured volume and stale block runs representing respective contiguous blocks of data no longer in use by the log-structured volume.

\* \* \* \* \*